(12) United States Patent
Huang et al.

(10) Patent No.: US 7,610,409 B2
(45) Date of Patent: Oct. 27, 2009

(54) METHOD FOR TRANSPORTING DATA THROUGH UNIVERSAL SERIAL BUS AND UNIVERSAL SERIAL BUS DEVICE

(75) Inventors: Yu Huang, Beijing (CN); Zhou Lu, Beijing (CN); Fan Chen, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 191 days.

(21) Appl. No.: 11/339,173

(22) Filed: Jan. 24, 2006

(65) Prior Publication Data

US 2006/0282577 A1 Dec. 14, 2006

(30) Foreign Application Priority Data

Jun. 8, 2005 (CN) ............ 2005 1 0075116

(51) Int. Cl.
*G06F 3/00* (2006.01)
*G06F 12/00* (2006.01)
(52) U.S. Cl. ............................ 710/6; 711/115
(58) Field of Classification Search ............. 710/6; 711/115
See application file for complete search history.

(56) References Cited

U.S. PATENT DOCUMENTS

2002/0081873 A1* 6/2002 Harris et al. ............. 439/79
2003/0225971 A1* 12/2003 Oishi et al. ............. 711/115
2004/0177258 A1* 9/2004 Ong ....................... 713/192
2005/0003804 A1* 1/2005 Huomo et al. ........... 455/414.1
2005/0240713 A1* 10/2005 Wu et al. .................. 710/314

OTHER PUBLICATIONS

Weber et al., Information Technology—SCSI Primary Commands, Jul. 18, 2001, National Committee for Information Technology, T10/1236-D, pp. 25, 147, and 230.*
Craig Peacock, USB in a Nutshell, 2001-2007, www.beyondlogic.org.*

* cited by examiner

*Primary Examiner*—Henry W. H. Tsai
*Assistant Examiner*—Hyun Nam
(74) *Attorney, Agent, or Firm*—Courtney Staniford & Gregory LLP

(57) ABSTRACT

A Universal Serial Bus data transport method and its device is disclosed. Data transport is performed through a high-speed transport technique based on a Universal Serial Bus, which consists of Universal Serial Bus protocol for communication between the device and the host, and SCSI protocol for interaction between the device and the upper driver layer. A data transport device using the Universal Serial Bus thus uses the embedded driver inside the operating system, which may be self-loaded/self-initialized, and have high data transport speed, and convenient to use.

18 Claims, 3 Drawing Sheets

METHOD FOR TRANSPORTING DATA THROUGH UNIVERSAL SERIAL BUS AND UNIVERSAL SERIAL BUS DEVICE

CROSS-REFERENCE TO RELATED APPLICATIONS

The current application claims priority under 35 U.S.C. § 119(a-d) or 35 U.S.C. § 365(b) to Chinese Patent Application 200510075116.2, filed with the Chinese State Intellectual Property Office on Jun. 8, 2005, and entitled "A Universal Serial Bus Data Transport Method and a Device thereof."

FIELD OF THE INVENTION

The present invention is related to a data transfer method and a device thereof, and in particular to a Universal Serial Bus data transfer method and a device thereof.

BACKGROUND OF THE INVENTION

The current Universal Serial Bus technology uses Universal Serial Bus block transport protocol, and has ease of use. In general, devices using this technology are classified into:

Driverless device: a device using a driver built in the operating system to load the device, and Driver device: a device requiring a driver from the manufacturer.

Traditionally, information security devices have been provided in a driver from the manufacturer, which is a so-called driver device. Such a device is often designed as a customized device of the developer. Later, driverless software protection products are introduced to the market, whose drivers are provided directly by the operating system, and are so-called driverless devices, for example, ROCKEY2, from FEITIAN Technologies Co., Ltd, which uses a low-speed Human Interface Device (HID) as its communication protocol. Compared with other driver information security devices, driverless information security device is much slower in data transfer. Generally, such driverless protocol as HID is only used for mouse, keyboard and other input devices for which the data volume to be handled by the system is small.

The main shortcoming of a driver information security device is the inconvenience of use, and the particularity of either software protection device or other information security device, i.e., the driver provided to an end user can be of different versions and developed by different developers. When such a driver is developed by different developers, a problem may arise in that user may face two different versions of a driver for devices of same kind that may collide with each other and lead to a failure in user installation and even a crash of the system. Nevertheless, the installation process of the driver per se is a potential threat and source of corruption for the operating system.

The main shortcoming of a driverless software protection device widely used is low speed. Therefore, a conventional HID device cannot meet the requirements of current information security devices.

The main problem inherent in driverless Universal Serial Bus devices is that the communication with the host is determined by the protocol that is defined on the host, i.e., the Universal Serial Bus protocol. Therefore, in order to improve the transfer speed, the transfer protocol should be improved and a high-speed protocol should be selected to meet the requirements of such an information security device.

For a software protection device or other information security devices, these two shortcomings are unacceptable. First, the main performance indications of information security device are the running speed and communication rate. The running speed is the speed at which instructions are run in the device, which is mainly limited by algorithms and the CPU speed, and cannot be improved dramatically. To improve the performance, the key is the communication speed. A driverless low-speed device cannot meet the best operating state, and therefore leads to low running efficiency of user program. On the other hand, since there are many kinds of developer's programs, in case of a driver customized device, the driver has to be installed in all end users' computers using the program, which causes inconvenient use of developers' program. Finally, when a developer offers a small program, since the driver is a special program that exists in the user's computer, the existence of the driver per se is a potential threat (such as causing instability of system) to the user's computer system, and causes waste of resources.

The USB flash memory, which has been popular since 2002, is a high-speed device based on Universal Serial Bus, but such USB flash is used mainly for data storage, and no CPU and self-defined algorithm exist therein, so it cannot be applied to software protection or an information security device.

SUMMARY OF THE INVENTION

An object of this invention is to overcome the above shortcomings, and provide a secure and high-speed Universal Serial Bus data transport method and a device thereof.

In order to overcome the technical problems above, the object of this invention is achieved by the following solutions: a Universal Serial Bus data transport method, wherein the communication between the host and Universal Serial Bus device is performed by the following processes:

1) the host initializing the Universal Serial Bus device,
2) the host sending commands to the device,
3) the device parsing and processing the commands,
4) the device responding to the application of the host.

In the process of sending commands from the host to the device, the host converts the commands into SCSI (Small Computer System Interface) commands via a SCSI protocol, and encapsulates them into a Universal Serial Bus command package and transfers data via Universal Serial Bus protocol.

The operating system in the host controls the host to transfer data with the device directly.

The Universal Serial Bus protocol may be a high-speed Universal Serial Bus bulk data transport protocol.

The SCSI protocol may include INQUIRY, READCAPS.

In the step 2) above, sending data from the host to the device may include the following steps:

a) the application running on the host sending instructions through device objects to input/output data,
b) the device driver of the operating system converting the basic instructions into SCSI commands,
c) the device driver of the operating system converting the SCSI commands into a Universal Serial Bus data package.

In the step 3) above, the commands parsing and processing by the device may include the following steps:

i. the device processing the Universal Serial Bus data package that includes Small Computer System Interface (SCSI). In an embodiment, SCSCI as used herein indicates revision 23 of the SCSI Protocol dated May 04, 2005, but embodiments are not so limited. Later revisions may be made to the Protocol without changing the scope of the claimed invention.

ii. the device parsing the Universal Serial Bus data package into user data package, and executing related commands based on it.

In the above step ii, during the commands executing process, the operation may include secure storage, access control, and data processing.

During the data processing, the operation on the data includes customized processing and standard processing. The standard data processing includes processing data through at least one of the following encryption/decryption algorithms: Rivest-Shamir-Adleman (RSA) algorithm version 1.5 dated Nov. 01, 1993, Data Encryption Standard (DES) dated Oct. 25, 1999, Triple DES (3DES) dated Oct. 25, 1999, Message Digest algorithm 5 (MD5) dated April, 1992, Secure Hash Algorithm-1 (SHA-1) dated September, 2001, Advanced Encryption Standard (AES) dated Nov. 26, 2001 and Elliptic Curve Cryptography (ECC) version 1.0 dated Sep. 20, 2000. The specific dates and version numbers of the aforementioned algorithms are particular to embodiments, but other embodiments are not restricted to the stated dates and version numbers. The versions of the algorithms may change without affecting the scope of the claims.

The bulk data transport protocol between the Universal Serial Bus and the device can be implemented by the following steps:

A. sending the device descriptor,
B. sending the device configuration descriptor,
C. sending a character string descriptor, and
D. performing device communication.

Such a method can be applied to software protection and information security area.

A Universal Serial Bus transfer device can include:

A CPU (central processing unit for executing firmware and user program, a Universal Serial Bus interface chip for communication between the device and the host, and memory to store firmware, user data, algorithm and other information.

The CPU is connected with the Universal Serial Bus interface chip and the memory, respectively.

An MCU chip may be included, which includes the integrated CPU, Universal Serial Bus interface chip and memory.

An integrated MCU chip and Universal Serial Bus interface chip may be included, the integrated MCU chip including the integrated CPU and memory.

The MCU chip may be a smart card chip.

The CPU may be a single chip computer; and the memory may include RAM, ROM, EPROM, EEPROM and FLASH.

From the above solutions, data transfer is performed by the use of a Universal Serial Bus protocol between the host and the device, and SCSI protocol through which the device interacts upwardly with a disk driver in the present invention, such high-speed Universal Serial Bus storage technology is therefore made to have a higher transfer speed and ease of use. In the invention, the data is transferred through a Universal Serial Bus, and only the driver that has been already embedded in the operating system is needed to initialize the device. No extra driver is needed in the popular operating systems, including Microsoft Windows ME, 2000, XP, 2003, Linux and Mac OS. For an operating system that does not provide such an embedded driver (for example Windows 98), the operating system developer also provides extra driver for such device. The advantages of such driver over drivers used by conventional driver device are:

1. Better compatibility. Such driver is provided by the operating system provider, being able to run stably in the operating system and support more devices, i.e., all devices of this class.

2. Better stability. Such driver is provided by the operating system provider, having been fully tested and containing digital signature information.

In addition, this invention does not provide file system support, i.e., no disk letter will be generated in the user's computer system, in order to meet the requirements of information security products. That is, applications interact with disk device directly, and implement the control through a Card Operating System, instead of operating the files in the device directly by the file system. Such design generally guarantees good security.

DETAILED DESCRIPTION OF THE EMBODIMENTS

Figure 1:
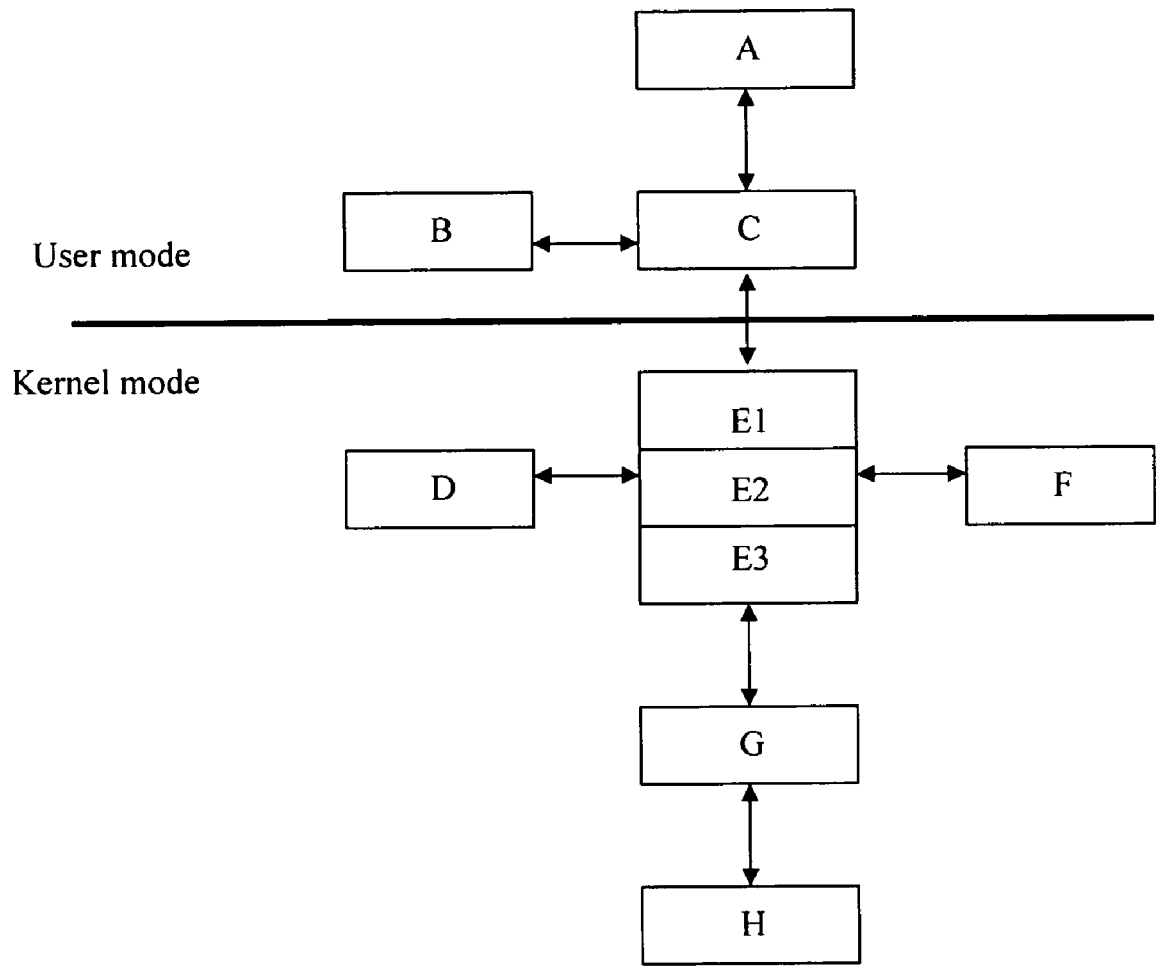
FIG. 1 is a schematic showing the positions of the individual communication modules in a system according to embodiments.

This invention discloses a high-speed storage technology based on Universal Serial Bus that consists of a Universal Serial Bus block transfer protocol and a SCSI protocol.

Such a method uses the driver that has been already embedded in the operating system to load or initialize the device. The popular operating systems that provide such a driver are Microsoft Windows ME, 2000, XP, 2003, Linux and Mac OS. Even in an operating system that does not provide such embedded driver (for example Windows 98), the operating system developer may also provides extra driver for such a device. The advantages of such driver over drivers used by conventional driver device are:

1) Better compatibility. Such driver is provided by the operating system provider, be able to run stably in the operating system and support more devices, i.e., all devices of this class.

2) Better stability. Such driver is provided by the operating system developer, having been fully tested and containing digital signature information.

The classification of the methods of communication of Universal Serial Bus device in terms of transport speed is as follows:

1. Low-speed, mainly used by keyboard, mouse, joy stick and other interacting devices. The transport speed is between 10 and 20 kb/s. The features of such devices are ease of use, low price and supporting plug and play.

2. Medium-speed, mainly used by telephone, audio and compressed video devices. The transport speed is between 500 kb/s and 10 Mb/s. The features of such devices are ease of use, low price, dynamic plug and play, limited bandwidth and delay.

3. High-speed, mainly used by disk and audio devices. The transport speed is between 25 and 500 Mb/s. The features of such devices are ease of use, high bandwidth and limited delay.

The classification of the methods of communication of Universal Serial Bus devices in terms of Universal Serial Bus protocol is as follows:

1. Control data transfer, setting a device when it is connected, and performing a control of a specific device, such as channel control.

2. Bulk data transfer, producing and using a bulk of data under a transport constraint, and having a board dynamic range.

3. IRQ data transfer, describing or matching the human feeling or the feedback of characteristic response.

4. Synchronized data transfer, filling the predefined bandwidth of the Universal Serial Bus with a predetermined transfer delay.

In this invention, the communication between the device and the host is based on the Universal Serial Bus bulk data transport protocol; the device uses the SCSI protocol to interact upwardly with the device driver and the operating system.

In a Windows system, for example, loaded in the host, the Universal Serial Bus transfer device in the present invention performs the following steps to achieve the data transport method:

1. The host application identifies the device by sending INQUIRY SCSI command via disk devices. When the device is connected to the computer system, the operating system sends the device an instruction for extracting a descriptor, which mainly gets the information of the hardware on manufacturer, product and serial number. When loading the device, the operating system first sends it an INQUIRY command package, wherein the key is to set DeviceType field to DIRECT_ACCESS_DEVICE, then the device will work as a disk device, and the manufacturer and product character strings are assigned therein, based on which the device will be identified in the program. Here, idVendor idProduct iManufacturer iSerialNumber fields are mainly used to define manufacturer, product ID and hardware serial number. At this time, iManufacturer iSerialNumber are the indices to character strings, which is a command for extracting character string descriptor, as mentioned in the following.

2. After the operating system has processed the device descriptor, a command for extracting a configuration descriptor, which mainly contains configuration descriptor, interface descriptor, port descriptor and character string descriptor will be sent. In this invention, the key to implement the device as a disk class device is to process the interface descriptor, wherein the key fields are bInterfaceClass and bInterfaceProtocol. In this invention, the value of bInterfaceClass is 08H, which means the device's class is MESS STORAGE; bInterfaceProtocol is 50H, which means the communication protocol of this device is BULK-ONLY. When finishing processing of the descriptors, the operating system loads the driver automatically, and then after generating a physical disk object based on MESS STORAGE, loads the disk device via the disk driver. The character string descriptor is mainly to provide the character string required for extracting the device descriptor in the first step. imanufacturer, iSerialNumber and others are only the indices to the strings sent in the string descriptor at this time. These three fields are byte number of character string, descriptor type and character string. After the steps above, the initialization of the device is finished.

At the same time, the operating system gets the device capability through READCAPS, which is a SCSI command and is used by the operating system to get the capacity of the device and other information. It only needs to fill the DataBuf field of the SCSI command package with data in a REAS_CAPACITY_DATA structure to process the device capability.

LogicalBlockAddress field stands for the number of logical blocks. BytesPerBiock is the size of a block, which is the minimum data volume transferred in one communication. Based on the features of software protection products, it may be 256, 128 bytes or less. The total capacity of the device is the product of these two values.

3. Device communications. When finished with the initialization of the device, applications can communicate with the device through APIs (application program interfaces). In the communication, the device parses the SCSI data package from the CBW data package received.

When applications in the upper layer read data from the device via ReadFile, the disk driver of the system converts the commands into corresponding SCSI command READ 10 and transfers it to the lower layer. Because the processing of this command is different from that of a standard disk, and only part of the protocol is implemented, the operating system need not consider such information as the offset and length, and only DataBuf field is needed to be considered, which includes self-defined communication protocol, i.e., the user data returned by the device after the operating system sends commands to the device. The detailed steps are:

1) Host applications send ReadFile and WriteFile and other file I/O commands via the disk device to input/output data.

2) The disk device driver of the operating system converts the basic I/O commands (ReadFile, WriteFile) into SCSI commands.

3) The disk device driver of the operating system sends the SCSI commands to Universal Serial Bus STORAGE.

4) The Universal Serial Bus STORAGE encapsulates the SCSI commands into Universal Serial Bus commands, i.e., Universal Serial Bus data package.

4. The device performs processing based on the SCSI commands, and returns a status package, CSW, to the application, and then a communication process is finished between the application and the device. The detailed steps are:

1) The device processes the Universal Serial Bus data package that includes SCSI commands.

2) The device parses the Universal Serial Bus data package into a user data package, and executes the related commands based on it. The operation on data includes a customized process and a standard process. The standard process includes: RSA, DES, 3DES, MD5, SHA-1, SSF33, AES and ECC.

In this process, the device is authenticated and authorized by parsing the commands and data in the data package, to determine the authority to write/read data in the device.

5. When applications in the upper layer write data to this device through WriteFile, the disk driver of the system converts this command into the corresponding SCSI command WRITE10 and sends it to the lower layer. Because the processing of this command is different from that of a standard disk, and only part of protocol is implemented, the operating system need not consider such information as the offset and length, and only DataBuf field is needed to be considered, which includes self-defined communication protocol, i.e., the user data after the operating system sends commands to the device.

On the other hand, in this invention, the host application interacts with the device directly, and implements the control via the operating system inside the device, instead of operating the files in the device through the file system, i.e., no file system is supported, so no disk letter is produced in the user's computed system, in order to meet the requirements of the information security products.

FIG. 1 shows the positions of individual communication modules in a system according to the present invention.

Applications A include user programs, and interface libraries provided for users according to the invention, through which user programs can access the device.

Win32API C refers mainly to the API interface functions provided in Windows operating system, including CreateFile, ReadFile, WriteFile, DeviceIoControl, etc. These functions are the basis for implementing user interface libraries provided in this invention. The interface libraries mainly use these APIs to interactively communicate with disk drivers in the lower layer.

User-mode drivers B are used to provide interfaces for the access to kernel-mode drivers. In this invention, they are used to describe the level at which the API interface functions C exist in the system.

Other kernel-mode drivers D are used to provide services for the user-mode drivers to access the hardware and system functions. In this invention, they are used to describe the function level at which the following E1, E2 and E3 exist in the system.

Disk drivers E1 are defined by the operating system, and responsible for converting the read/write requests into SCSI protocol and sending them to the device in the lower layer.

SCSI drivers E2 mainly refer to SCSI adapters, being defined by the operating system, and responsible for encapsulating the SCSI protocol in the upper layer and sending it to the device in the lower layer.

Universal Serial Bus drivers E3 mainly refer to Universal Serial Bus STORAGE drivers, being defined by the operating system, and responsible for encapsulating the SCSI protocol in the upper layer into Universal Serial Bus data packages and sending to the hardware abstraction layer G.

File system driver F is used to provide file system management for the system, such as FAT32.

HAL, the hardware abstraction layer G, is defined and implemented by the operating system, mainly used to provide the hardware access services and interact with the hardware based on the hardware requests from the upper layer.

Universal Serial Bus device H is the firmware in the Universal Serial Bus device, used to parse and process the Universal Serial Bus data package and describe the device of this invention.

Also, this invention provides a communicating interface for Universal Serial Bus data transfer, which implements at least one function of an information security product. This interface is responsible for forwarding the user's requests to the device. The SCSI protocol implemented in this invention can promote the device support to the disk layer of the operating system, i.e., a disk appearing in the operating system, but not implementing the file system thereof, so no accessing interface based on the file is provided in the operating system. For example, in the Windows operating system, the program in the application layer can enumerate devices in the disk layer via SetupAPI, and then perform an Inquiry on each deice to identify whether the device is its own, and finally open a device handle through the CreateFile API to communicate. This interface implements the communication with direct reading/writing through the disk layer, through API functions provided by the operating system.

Based on the above techniques, two preferred embodiments are provided.

Embodiment 1 is a software protection device.

Figure 2:
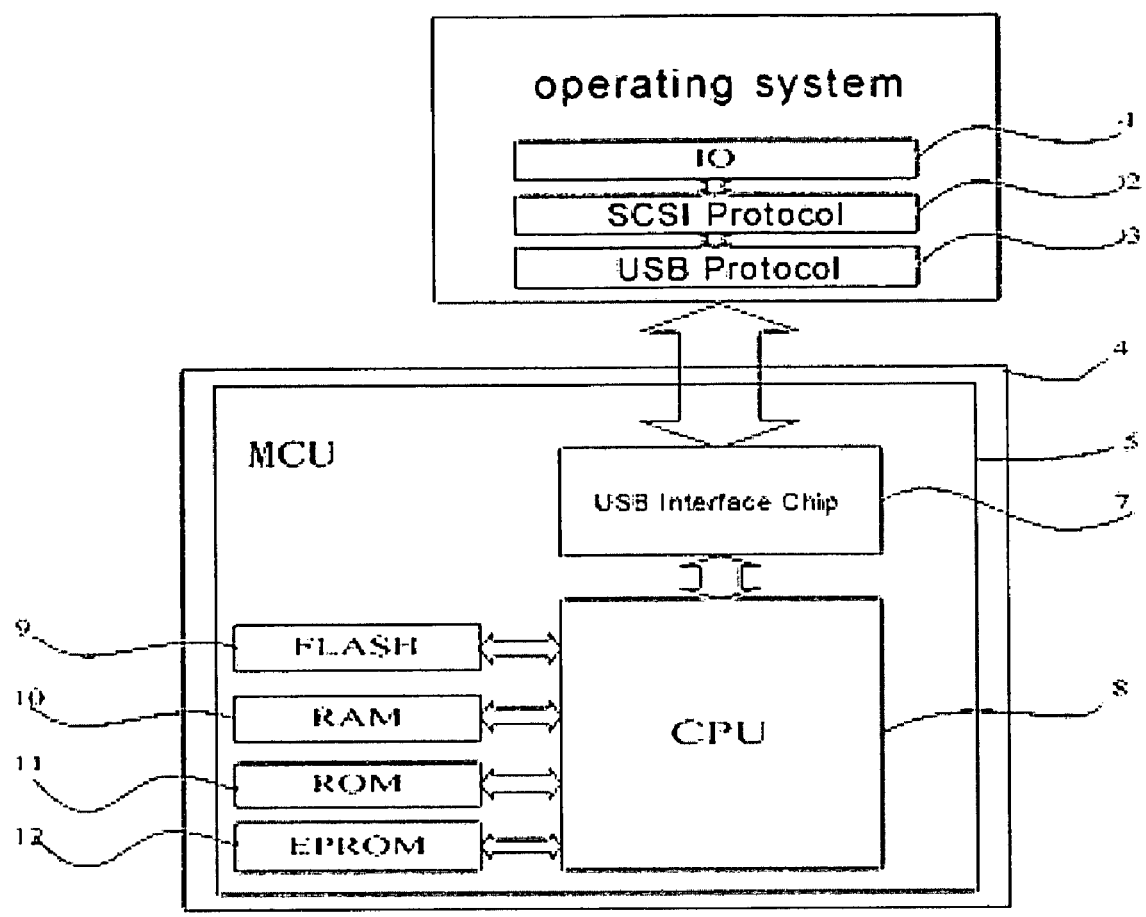
FIG. 2 is a schematic of a software protection device according to a first embodiment.

As shown in FIG. 2, this device includes an integrated MCU (microcontroller) chip 5, which integrates CPU 8, and a Universal Serial Bus interface chip 7 and a memory connected with the CPU respectively. In this embodiment, CPU 8 may be Intel 8051, Philips 80C31 and other microprocessors. The memory may be FLASH 9, RAM 10, ROM 11, EPROM 12, etc. The USB interface chip 7 communicates with I/O commands 1 in the host operating system via Universal Serial Bus protocol, i.e., USB protocol 3 in this embodiment, and SCSI protocol 2. In general, the MCU may be a single chip computer, such as 8051, etc., or a special smart card chip, such as ATMEL6464C-U. The advantage of a smart card chip is the internal programs and normal data can be guaranteed not to be read without authorization to the device.

The memory is mainly used to store firmware, standard algorithms, and user programs. The standard algorithms include floating operations, standard encryption/decryption algorithms, such as DES, RSA, AES, TDES, etc. The user programs are self-defined execution logics of any segment of the program based on user's needs in use.

The memory is also used to save a fragment of user software to guarantee the security thereof and not to be read out. This fragment is run therein and interacts with the external software. Thus, the software is controlled to guarantee against unauthorized running. The feature of this embodiment is the communication with external program is frequency and the main performance indication in speed is the computation speed and communication speed.

In this embodiment, the software protection functions to be implemented are:

1. Acquiring device information. The information is mainly that of the software protection device. All the information is stored in the internal memory, and mainly used to provide user a function to remember and identify his own device.

2. Formatting. The user can format the device. After the formatting, all the settings and data will be restored to the status when manufactured.

3. Writing files. Such files include fragments of user code or the data required for the execution of the fragments.

4. Reading files. Such files may be the data files required for the execution of the code fragments, but not the code fragments themselves.

5. Executing files. Such files are the code fragments written in by user. The code fragments are executed inside the device, and all the data and memory information generated during the execution is guaranteed to be retained inside the device and only the results are returned.

6. Encryption/decryption, which is provided to the user to perform such encryption/decryption as RSA, DES, 3DES inside the hardware. The results are returned to the user.

7. Remote upgrading, which is used to upgrade the customer's device via a network or others after the software has been released by the user, without the need of addressing the device back from its customer.

Software protection APIs (SDK).

The software protection APIs provide third-party interfaces to software protection devices.

The developers are the main users of the software protection APIs.

The main functions of such APIs are:

1. Opening device. Open the device's handle, and establish a communication channel with the device.

2. Closing device. Clear the device's handle and reset the status when the device is no longer used.

3. Sending commands. This is the core of the software protection product, implementing all settings of the device, i.e., all the software protection functions.

The role of the software protection device is mainly to protect parts of the program from present in the memory of PC. The advantages of this method are:

1. Anti un-authorized copy. The program on the PC is not complete without the software protection device. Software release entails the existence of the software protection device.

2. Anti un-authorized debugging and tracking. The code of the important part of the software is not executed in the PC. No debugging software can get execution status of this segment of the software.

3. Anti dump. Enveloping is the traditional software protection method. The code of traditional enveloped software can be most readily decrypted in case of being dumped during execution.

4. Anti de-compilation. No de-compilations, no matter how advanced they are, can get the code fragments inside of the software protection device, to achieve the whole functions of the software.

Embodiment 2 is an identity verification device.

Figure 3:
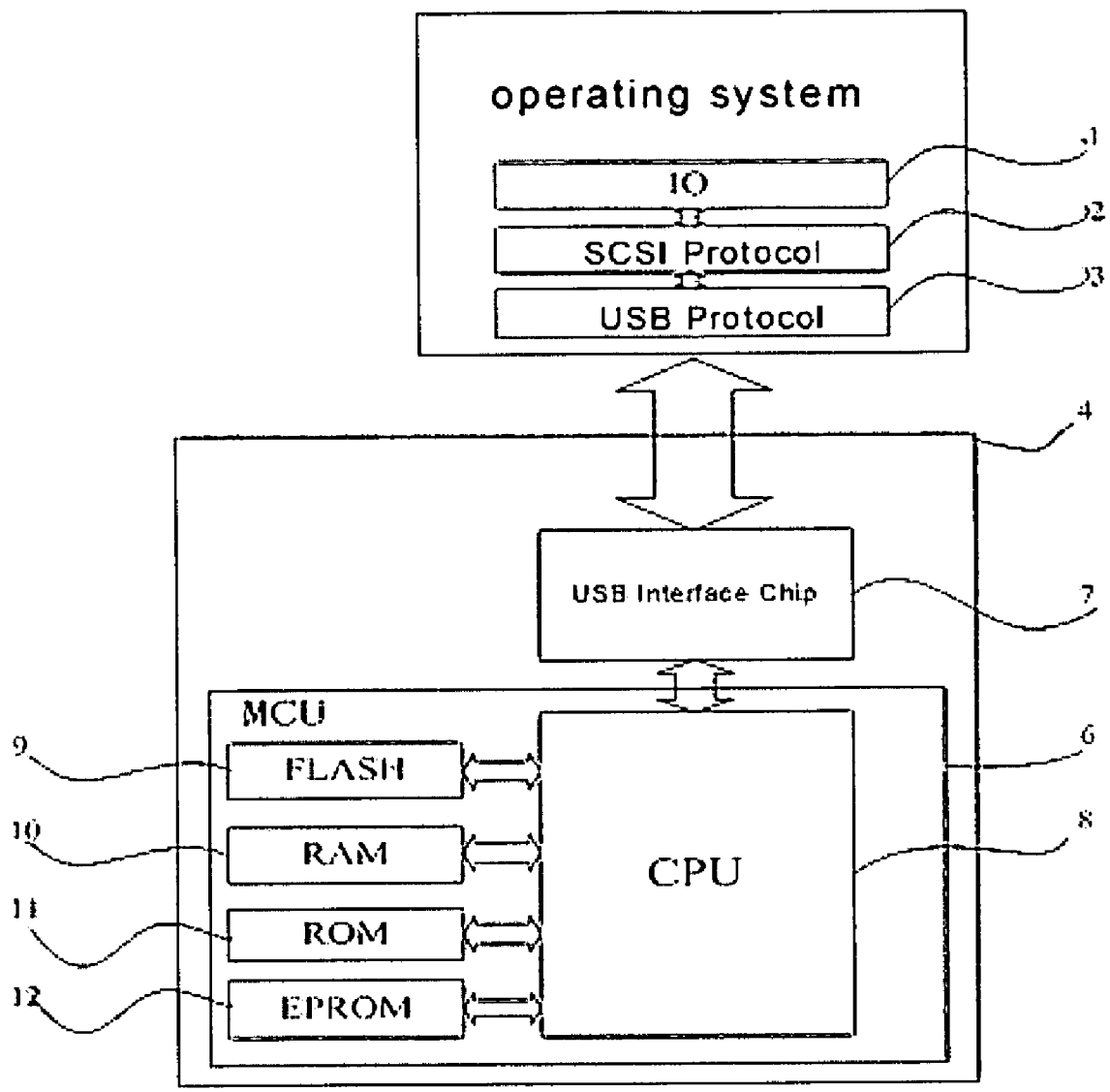
FIG. 3 is a schematic of an identity verification device according to a second embodiment.

As shown in FIG. 3, the device includes an integrated MCU chip 6 and a Universal Serial Bus interface chip 7. The integrated MCU chip 6 integrates CPU 8 and a memory that is connected with the CPU. The Universal Serial Bus interface chip 7 is connected with CPU 8 in the integrated MCU chip 6. CPU 8 may be any micro processor like Intel 8051, Philips 80C31. The Universal Serial Bus interface chip 7 may be any interface chip communicating with the Universal Serial Bus interface of the PC, USB interface in this embodiment. The memory may be FLASH 9, RAM 10, ROM 11, EPROM 12, etc. The USB interface chip 7 interacts via Universal Serial Bus protocol, i.e., USB protocol 3 in this embodiment, and SCSI protocol 2, with I/O commands 1 of the host operating system. In general, the MCU chip may be a single chip processor, such as 80C51, etc., or a special smart card chip, such as ATMEL6464C-U. The advantage of a smart card chip is the internal program and normal data cannot be read without the authorization.

The memory is mainly used to store firmware, standard algorithms, and user programs. The standard algorithms include floating operations, standard encryption/decryption algorithms, such as DES, RSA, AES, TDES, etc. The user programs are self-defined execution logics of any segment of the program based on user's needs in use.

In this embodiment, the device is mainly used to store user's sensitive data, such as password, digital certificate, etc. The device in this embodiment is based on a smart card, which functions as:

1. Access control to a network. The smart card functions of this embodiment comprise ID information and user verification information for network logon.

2. Digital signature or certificate for verifying and authenticating the identity of the file sender, which is prevented from being tampered with during the delivery.

3. Logon control to a computer. The smart card logon is already an embedded function of modern operating systems, which can prevent the password from being spied or stolen when entered.

4. Logging onto a protected Web page. The protected Web site, such as on-line bank, may use digital signature to identify the users.

5. Access control to files. The access control information may be added to files. Without a smart card inserted, no one can access/execute the files.

6. Logon control to particular application system. The developers may use the functions for their own products which may logon with the device of this embodiment.

Digital signature device API (SDK):

Digital signature device APIs provide third-party interfaces to the digital signature devices.

The developers are the main users of such APIs.

The main functions of such APIs are:

1. Opening device. Open the device's handle, and establish communication channel with the device.

2. Closing device. Clear the device's handle and reset the status when the device is no longer used.

3. Sending commands. This is the core of the digital signature device, which implements all the settings of the device i.e., all the smart card functions of the digital signature device.

The main role of the digital signature device is to protect the important sensitive data from being read out of the device, such as into the memory of the PC. The advantages of this method are:

1. Users need not remember redundant passwords. A secure password is a character string combination of alphabets and numbers, and need to be updated frequently. Storing password information with smart card avoids the inconvenience caused to users.

2. Double-secured protection. Even if the digital signature device or the password is lost, there is no risk caused to users.

A Universal Serial Bus data transfer method and a device thereof has been described, in which the principle of the invention and its implementation are explained by way of example embodiments. The description of the embodiments is only to assist in understanding the inventive method and its core idea. It will be apparent to those skilled in the art that various modifications can be made to the way of implementation and application of the instant invention without departing from the scope of spirit of the invention, and it is intended that the description of the present invention not be construed as limiting of the invention.

The invention claimed is:

1. A method for transporting data between a host and a Universal Serial Bus device through Universal Serial Bus, comprising:

initializing the Universal Serial Bus device;

sending commands from the host to the Universal Serial Bus device;

parsing and processing the commands by the Universal Serial Bus device; and responding to an application of the host by the Universal Serial Bus device;

wherein, when the host sends the commands to the Universal Serial Bus device, the host converts the commands into Small Computer System Interface (SCSI) commands through a SCSI protocol, encapsulates the SCSI commands into a Universal Serial Bus command package, and transfers data through a Universal Serial Bus protocol;

no disk letter is generated for the Universal Serial Bus device at the host;

the step of parsing and processing the commands by the Universal Serial Bus device comprises:

processing a Universal Serial Bus data package that contains the SCSI commands by the Universal Serial Bus device; and parsing the Universal Serial Bus data package into a user data package, and executing related commands based on the user data package by the Universal Serial Bus device;

the related commands, when being executed, implement a function of data processing;

the data processing includes customized data processing and standard data processing, the standard data processing including processing data through at least one encryption/decryption algorithm; and the related commands are executed by implementing only a part of the SCSI protocol without considering offset and length information and by considering only a DataBuf field, which includes user data returned by the Universal Serial Bus device after an operating system sends the related commands to the Universal Serial Bus device.

2. The method of claim 1, wherein an operating system of the host controls the host to communicate with the Universal Serial Bus device directly.

3. The method of claim 1, wherein the Universal Serial Bus protocol is a Universal Serial Bus bulk data transport protocol.

4. The method of claim 3, wherein the Universal Serial Bus bulk data transport protocol is implemented by:
sending device descriptors;
sending configuration descriptors;
sending character string descriptors; and
performing device communication.

5. The method of claim 1, wherein the SCSI commands include INQUIRY command, and READCAPS command.

6. The method of claim 1, wherein the step of sending commands from the host to the Universal Serial Bus device comprises:
sending the commands by the application of the host through a device object to input/output data;
converting basic commands into the SCSI commands by a device driver of the operating system; and
converting the SCSI commands into the Universal Serial Bus data package by the device driver of the operating system.

7. The method of claim 1, wherein the method is applied to information security or software protection.

8. The method of claim 1, wherein the Universal Serial Bus device is authenticated and authorized through commands and data contained in the user data package.

9. The method of claim 1, wherein the related commands include READ10 and WRITE10.

10. The method of claim 1, wherein the Universal Serial Bus device includes code fragments configured so that all data and memory information generated during execution of the code fragments is guaranteed to be retained in the Universal Serial Bus device and only results of the execution are returned to the host.

11. A Universal Serial Bus device comprising:
a Central Processing Unit (CPU), for running firmware and user programs;
a Universal Serial Bus interface chip, for communicating between the Universal Serial Bus device and a host; and
a memory, for storing firmware, user data, algorithms and other information;
wherein the CPU is connected with the Universal Serial Bus interface chip and the memory, and is configured to process a Universal Serial Bus data package that is transported from the host and contains Small Computer System Interface (SCSI) commands converted by the host, parse the Universal Serial Bus data package into a user data package, and execute related commands based on the user data package;
the Universal Serial Bus device is configured so that no disk letter is generated for the Universal Serial Bus device at the host when the Universal Serial Bus device is connected to the host;
the related commands, when being executed by the CPU, implement a function of data processing; and
the data processing includes customized data processing and standard data processing, the standard data processing including processing data through at least one encryption/decryption algorithm; and
the related commands are executed by implementing only a part of a SCSI protocol without considering offset and length information and by considering only a DataBuf field, which includes user data returned by the Universal Serial Bus device after an operating system coupled to the device sends the related commands to the Universal Serial Bus device.

12. The Universal Serial Bus device of claim 11, wherein the CPU, the Universal Serial Bus interface chip and the memory are integrated into an integrated Micro Controller Unit (MCU) chip.

13. The Universal Serial Bus device of claim 12, wherein the MCU chip is designed securely, and includes a smart card chip.

14. The Universal Serial Bus device of claim 11, wherein the CPU and the memory are integrated into an integrated MCU chip.

15. The Universal Serial Bus device of claim 11, wherein the CPU is a single chip processor; and the memory includes at least one of Random Access Memory (RAM), Read Only Memory (ROM), Erasable Programmable Read Only Memory (EPROM), Electrically Erasable Programmable Read Only Memory (EEPROM) and flash memory.

16. The Universal Serial Bus device of claim 11, wherein the Universal Serial Bus device is authenticated and authorized through commands and data contained in the user data package.

17. The Universal Serial Bus device of claim 11, wherein the related commands include READ10 and WRITE10.

18. The Universal Serial Bus device of claim 11, further comprising code fragments configured so that all data and memory information generated during execution of the code fragments is guaranteed to be retained in the Universal Serial Bus device and only results of the execution are returned to the host.

* * * * *